United States Patent [19]

Kitamura et al.

[11] 4,392,582

[45] Jul. 12, 1983

[54] RETORTABLE BONDED CAN

[75] Inventors: Yoichi Kitamura; Hisashi Hotta, both of Yokohama, Japan

[73] Assignee: Toyo Seikan Kaisha Limited, Japan

[21] Appl. No.: 251,945

[22] Filed: Apr. 7, 1981

[30] Foreign Application Priority Data

May 26, 1980 [JP] Japan ................................. 55-69012

[51] Int. Cl.$^3$ ...................... B65D 25/14; B65D 25/34; B32B 15/08; B32B 27/38
[52] U.S. Cl. ..................................... 220/75; 220/456; 220/458; 428/35; 428/418; 428/469; 428/623; 428/626; 428/629
[58] Field of Search ............... 220/454, 456, 457, 458, 220/75; 428/413, 418, 469, 472, 623, 626, 629, 35

[56] References Cited

U.S. PATENT DOCUMENTS

| 3,827,866 | 8/1974 | Uchida et al. ...................... 428/623 |
| 3,860,398 | 1/1975 | Tsurumaru et al. ................ 428/623 |
| 3,937,752 | 2/1976 | Ueno et al. ......................... 428/458 |
| 4,101,534 | 7/1978 | Ueno et al. ....................... 428/425.8 |
| 4,173,290 | 11/1979 | Kobayashi et al. ................. 220/456 |
| 4,296,182 | 10/1981 | Matsubayashi et al. ............ 428/418 |
| 4,318,754 | 3/1982 | Kosuge et al. ..................... 220/457 |
| 4,324,822 | 4/1982 | Kobayashi et al. ................. 428/418 |

FOREIGN PATENT DOCUMENTS

| 48-18096 | 6/1973 | Japan . |
| 50-37690 | 12/1975 | Japan . |
| 51-18978 | 6/1976 | Japan . |
| 53-55342 | 5/1978 | Japan . |
| 55-126045 | 9/1980 | Japan ................................. 220/456 |

OTHER PUBLICATIONS

Ueno, H., "Adhesion in Can Industry", Journal of Japanese Society of Adhesion, 11(2), pp. 26-31 (1975).

Primary Examiner—William R. Dixon, Jr.
Attorney, Agent, or Firm—Wenderoth, Lind & Ponack

[57] ABSTRACT

A retortable bonded TFS can coated with an organic lacquer film in which the seaming portion of the can body is bonded with an organic adhesive, characterized in that (1) the amounts of the metallic chromium layer and the chromium oxide layer deposited are 70-130 mg/m$^2$ and 5-30 mg/m$^2$, respectively, as metallic chromium; the amount of alkali-soluble chromium in these layers after heating at 210° C. for 10 minutes is not more than 12 mg/m$^2$ and not more than 70% by weight of the amount of the deposited chromium oxide before heating; the area of thickness unevenness of the chromium oxide is not more than 10%; and the amount of metal exposed is not more than 30 mg/dm$^2$, expressed as the amount of copper deposited (2) the organic lacquer film layer is a baked and cured film of a mixed lacquer composed of 70 to 85 parts by weight of an epichlorohydrin-bisphenol A type epoxy resin having a number average molecular weight of 2900 to 3750 and 30 to 15 parts by weight of a resol-type phenolic resin derived from a monohydric phenol, bisphenol A and an aldehyde; the phenolic resin has such a molecular weight distribution that the proportion of a high-molecular-weight portion having 3 or more rings is 60 to 70% by weight and the proportion of a low-molecular-weight portion having 2 or less rings is 40 to 30% by weight; and the baked and cured film contains 83 to 87 parts by weight of the epoxy resin and 17 to 13 parts by weight of the phenolic resin, and (3) the adhesive is a linear polyamide adhesive.

1 Claim, No Drawings

RETORTABLE BONDED CAN

This invention relates to a can made of a steel sheet having a chromium coated layer and a coated film layer of an organic lacquer formed thereon with its seaming portion bonded with an organic adhesive, and particularly to a coated bonded can made of an electrolytic chromic acid treated steel sheet having excellent retortability and high-temperature water resistance.

In recent years, large quantities of tin-free steel (TFS), a steel sheet coated with chromium by electrolytic chromic acid treatment, have come into use in place of tinplate as a material for food-packed cans and other cans requiring corrosion resistance. Cans made of TFS, particularly TFS coated with an organic lacquer, however, is difficult to use in the field of canning which requires retorting of contents. This is because when an article is packed into a can and retorted at a high temperature of about 120° C., the bond strength between TFS and the lacquer film on the inside surface of the can is reduced, and consequently, the seamed portion of the can body is broken during retorting.

It is an object of this invention therefore to provide a TFS sheet for coated bonded cans which has excellent surface adhesion to an organic lacquer film, particularly under heating conditions.

Another object of this invention is to provide a bonded can made of a coated TFS sheet which well withstands retorting under heating conditions especially under wet heating conditions and does not undergo deterioration in performance after the treatment.

In accordance with this invention, the above objects are achieved by a retortable bonded can made of an electrolytic chromic acid treated steel sheet wherein at least a part of the can body is composed of a steel sheet having on at least one surface thereof a metallic chromium layer, a chromium oxide layer and an organic lacquer film layer arranged in this order from the steel sheet surface and at least a part of the seaming portion of the can body is bonded with an organic adhesive, characterized in that (1) the amounts of the metallic chromium layer and the chromium oxide layer deposited are 70–130 mg/m$^2$ and 5–30 mg/m$^2$, respectively, as metallic chromium; the amount of alkali-soluble chromium in these layers after heating at 210° C. for 10 minutes is not more than 12 mg/m$^2$ and not more than 70% by weight of the amount of the deposited chromium oxide before heating; the area of thickness unevenness of the chromium oxide is not more than 10%; and the amount of metal exposed, expressed as the amount of copper deposited, is not more than 30 mg/dm$^2$, (2) the organic lacquer film layer is a baked and cured film of a mixed lacquer composed of 70 to 85 parts by weight of an epoxy resin having a number average molecular weight of 2900 to 3750 and derived from epichlorohydrin and bisphenol A and 30 to 15 parts by weight of a resol-type phenolic resin, the total amount of these resins being 100 parts by weight; the phenolic resin is obtained by reacting a mixed phenol composed of 5 to 20% by weight of a monohydric phenol and 95 to 80% by weight of bisphenol A with an aldehyde in the presence of ammonia and has such a molecular weight distribution that the proportion of a high-molecular-weight portion having 3 or more rings is 60 to 70% by weight and the proportion of a low-molecular-weight portion having 2 or less rings is 40 to 30% by weight; and the baked and cured film contains 83 to 87 parts by weight of the epoxy resin and 17 to 13 parts by weight of the phenolic resin based on 100 parts by weight of the epoxy resin and the phenolic resin combined, and (3) the adhesive is a linear polyamide adhesive.

Generally, the electrolytic chromate-treated steel sheet has a surface coated with a chromium-containing layer, and the coated layer is usually composed of a metallic chromium layer and a chromium oxide layer. One characteristic feature of the TFS used in this invention is that the amount of the metallic chromium layer deposited is 70 to 130 mg/m$^2$, preferably 90 to 120 mg/m$^2$, and the amount of the chromium oxide layer deposited (calculated as metallic chromium) is 5 to 30 mg/m$^2$, preferably 10 to 25 mg/m$^2$.

If the amount of the metallic chromium layer deposited is less than 70 mg/m$^2$, the rust resistance of TFS itself is degraded, and the resistance of TFS to corrosion by can contents is reduced. If it is larger than 130 mg/m$^2$, the formability of TFS is reduced and when TFS is used as a can body, its corrosion resistance is poor. Furthermore, the cost of TFS production increases. On the other hand, when the amount of the chromium oxide layer deposited is smaller than 5 mg/m$^2$, it is difficult to obtain a uniformly distributed oxide layer, and the bond strength of the oxide layer is degraded, especially under wet heat conditions. If it is larger than 30 mg/m$^2$, the formability of TFS is reduced, and cracks form in the oxide layer during can making, resulting in reduced corrosion resistance.

Another feature of the TFS used in the invention is that the amount of alkali-soluble chromium in the chromium-containing layers after heat-treatment at 210° C. for 10 minutes is not more than 12 mg/m$^2$, preferably not more than 8 mg/m$^2$, and does not exceed 70% of the amount of the deposited oxide layer before heat-treatment. If the amount of alkali-soluble chromium after heat-treatment is larger than 12 mg/m$^2$ or is more than 70% of the amount of the oxide layer before heat-treatment, the bond strength of the chromium oxide layer is markedly reduced under wet heat conditions, and the bond withstand high-temperature retorting conditions at about 120° C.

Still another feature of the TFS used in the invention is that the amount of metal exposed, expressed as the amount of copper deposited, is not more than 30 mg/dm$^2$, preferably not more than 18 mg/dm$^2$. The amount of metal exposed refers to the amount of that part of substrate iron which is exposed, that is to say, that part of the substrate iron which is not coated with the metallic chromium layer nor with the chromium oxide layer. If this amount exceeds 30 mg/dm$^2$, the bond strength of the chromium-containing layer cannot be maintained at a high level, and markedly decrease under wet heating conditions.

A further characteristic feature of the TFS used in the invention is that the area of thickness unevenness of the chromium oxide layer is not more than 10%, preferably not more than 5%. If the area of thickness unevenness of the chromium oxide layer is larger than 10%, localized thick portions of the oxide layer become weak points. Thus, even when the bond strength of the layer is apparently good in a can body as made, it begins to decrease as soon as an article is packed in the can and retorted at a high temperature of about 120° C. The reduced bond strength finally leads to breakage of the can.

The various requirements of the TFS used in the invention which constitute the characteristic features of the invention are measured by the following methods.

(1) Amount of metallic chromium deposited A TFS specimen is boiled in a 30% aqueous solution of sodium hydroxide to remove the chromium oxide layer. The amount of metallic chromium is measured by an electrolysis method using 1 N sodium hydroxide as an electrolytic solution at a current density of 3 mA/cm$^2$.

(2) Amount of chromium oxide deposited

It is determined by a fluorometric X-ray method in the following manner.

A TFS specimen is subjected to counting with fluorescent X-rays to obtain a count number $C_o$. Then, the specimen is dipped for 10 minutes in a 30% aqueous solution of sodium hydroxide at 110° C., withdrawn, washed with water, and dried. The dried specimen is again subjected to counting with fluorescent X-rays to obtain a count number C. The amount of chromium oxide deposited is determined from the difference of the counts before and after hot alkali treatment ($C_o$-C).

(3) Amount of alkali-soluble chromium after heat-treatment at 210° C. for 10 minutes A TFS specimen heated in the dry state at 210° C. for 10 minutes is used, and the amount of the alkali-soluble chromium is determined in the same way as in (2) above.

(4) Amount of copper deposited

A TFS specimen is dipped for 10 seconds in conc. sulfuric acid, withdrawn, and allowed to stand perpendicularly for 10 seconds to remove the adhering sulfuric acid. The specimen is rinsed for 5 seconds in water in a beaker, and then washed with flowing water (tap water). The washed specimen is dipped in ethanol, withdrawn, and dried. The dried specimen is dipped for 60 seconds in a 5% aqueous solution of copper sulfate ($CuSO_4.5H_2O$) at 30° C., withdrawn, washed with flowing water, and dried to obtain a specimen having copper deposited thereon.

The specimen before deposition of copper and the specimen having copper deposited thereon are subjected to counting with fluorescent X-rays, and the amount of copper deposited is determined from the difference between count numbers $C_o$ and C.

(5) Thickness unevenness of chromium oxide

The surface of a TFS specimen is observed by a microscope having a magnification of 400X to determine an uneven part in a place where unevenness of chromium oxide is seen to be distributed most densely. The percentage of the area of the uneven part based on the total area of the visual field is measured by means of an area percentage meter for at least five visual fields. The average of the measured values for at least five visual fields is defined as the thickness unevenness ratio of chromium oxide.

(6) Sampling

The specimens used in (1) to (5) are taken in a transverse to the rolling direction of TFS from the central part and both side portions of the TFS sheet.

The TFS sheet of the invention having the characteristic features described hereinabove can be produced by various methods. Some of these methods are illustrated below. It should be understood however that these specific methods do not limit the present invention.

(i) The surface of a steel sheet is degreased, pickled and washed with water in a conventional manner, and then cathodically electrolyzed in an aqueous bath containing 10 to 100 g/liter of chromic anhydride ($CrO_3$) and as an addition agent, a sulfate ion or a fluorine ion in a concentration of 1/200 to 1/30 of the concentration of chromic acid.

(ii) The surface of a steel sheet is degreased, pickled and washed with water in a conventional manner, and subjected to chrome plating in an aqueous bath containing 100 to 300 g/liter of chromic anhydride and as an addition agent, a sulfate ion or a fluorine ion in a concentration of 1/100 to 1/150 of the concentration of chromic acid. Subsequently, the plated steel sheet is washed with warm water, or is immediately electrolyzed cathodically in an aqueous bath containing 10 to 100 g/liter of chromic anhydride ($CrO_3$) and as an addition agent, a sulfate ion or a fluorine ion in a concentration of 1/200 to 1/30 of the concentration of chromic acid.

In order that the TFS sheet of this invention having the above characteristic features can give a coated bonded can having excellent performance which meets the objects of the invention, it is necessary to coat the TFS sheet with a strictly specified corrosion-resistant lacquer.

One characteristic feature of the lacquer used in the invention is that it is composed of 70 to 85% by weight, preferably 75 to 80% by weight, of an epoxy resin having a number average molecular weight of 2900 to 3750 obtained by the reaction of epichlorohydrin with bisphenol A and 30 to 15% by weight, preferably 25 to 20% by weight, of a certain kind of resol-type phenolic resin.

If the proportion of the epoxy resin is less than 70% by weight and the proportion of the phenolic resin is larger than 30% by weight, the lacquer has the defect that when it is coated on TFS and baked, the resulting coated film lacks flexibility and cannot completely withstand all of the steps of can making and consequently, the corrosion resistance of a can made from TFS sheet is poor when an article is packed therein. Moreover, the bond strength of the coated film layer to TFS is reduced.

On the other hand, if the proportion of the epoxy resin is larger than 85% and the proportion of the phenolic resin is less than 15% by weight, a coated film from the resulting lacquer after baking and curing has insufficient hardness, and many scratches are caused during the can-making process to expose the substrate metal. Thus, a can body made from the resulting TFS sheet has low corrosion resistance, and the bond strength of the coated film layer is reduced under wet heating conditions.

When the molecular weight of the epoxy resin is less than 2900, a high bond strength between the lacquer and TFS cannot be obtained, and the resulting cured film cannot retain flexibility. On the other hand, when the molecular weight of the epoxy resin is higher than 3750, a high bond strength between the lacquer and TFS can neither be obtained.

Another feature of the corrosion-resistant lacquer used in the invention is that the phenolic resin is a resol-type phenolic resin obtained by reacting a mixed phenol consisting of 80 to 95% by weight, preferably 85 to 90% by weight, of bisphenol A and 20 to 5% by weight, preferably 15 to 10% by weight, of a monohydric phenol with an aldehyde in the presence of ammonia, and that the resol has such a molecular weight distribution that the proportion of a high-molecular-weight portion having 3 or more rings is 60 to 70% by weight and the proportion of a low-molecular-weight portion having 2 or less rings is 40 to 30% by weight.

If the proportion of bisphenol A in the mixed phenol is less than 80% by weight and the proportion of the monohydric phenol is larger than 20% by weight, the bond strength of the paint film layer is high at room temperature in the dry state but is markedly reduced under wet heating conditions. The same disadvantage arises when the proportion of bisphenol A is larger than 95% by weight and the proportion of the monohydric phenol is less than 5% by weight.

If the proportion of the high-molecular-weight portion of the resol is less than 60% by weight and the proportion of the low-molecular-weight portion is larger than 40% by weight, the bond strength of the lacquer film under wet heating conditions is markedly reduced, and the resulting TFS sheet cannot withstand high-temperature retorting at about 120° C. If the proportion of the high-molecular-weight portion is larger than 70% by weight and the proportion of the low-molecular-weight portion is less than 30% by weight, the hardness of the cured paint film is insufficient, and scratches are caused during the can-making process, thus reducing the corrosion resistance of a can body produced from the resulting TFS sheet. Moreover, the bond strength of the lacquer film layer is low.

Examples of the monohydric phenol used in the production of the phenolic resin in the invention include difunctional phenols such as o-cresol, p-cresol, 2,3-xylenol and 2,5-xylenol, and trifunctional phenols such as phenol and m-cresol. One or a mixture of at least two of these phenols can be used.

Formaldehyde and paraformaldehyde are suitable aldehydes for use in the production of the phenolic resin used in this invention.

A lacquer film obtained by coating the epoxy resin-phenolic resin mixed lacquer on TFS and baking it consists of 83 to 87% by weight, preferably 84 to 86% by weight, of the epoxy resin and 17 to 13% by weight, preferably 16 to 14% by weight, of the phenolic resin as a result of baking under predetermined baking conditions, for example at 205° to 225° C. for 10 minutes.

A coated film which can withstand retorting is given by this specific composition of the lacquer film after baking, and this fact has been discovered for the first time by the present inventors.

The molecular weight distribution of the resoltype phenolic resin and the composition of the coated film of the above lacquer are determined by the following methods.

MOLECULAR WEIGHT DISTRIBUTION OF THE RESOL-TYPE PHENOLIC RESIN

The molecular weight distribution of a sample phenolic resin is measured by high-speed gel permeation chromatography under the following conditions.

Measuring instrument: Model HLC802 UR, a product of Toyo Soda Co., Ltd.
Column:
G4000HS+G3000H8+G2000H8+G2000HS, each having a diameter of ⅜ inch and a length of 2 feet.
Theoretical number of stages: 8000
Carrier: tetrahydrofuran
Flow rate of the carrier: 0.72 ml/min.
Amount of the sample injected: 2 ml
Solid concentration in the sample: 0.3%
Method of detection: refractive index Separately, the individual peaks are identified by using a model compound, and the integral of the chromatogram areas of products having two or less rings and products having three or more rings is calculated.

COMPOSITION OF THE COATED FILM AFTER BAKING

The amount of volatile matter (phenol resin oligomer) volatilized during the baking of the coated film is measured. The balance obtained by subtracting the amount of volatile matter from the amount of the phenolic resin as charged in the production of the lacquer is defined as the amount of the phenolic resin remaining in the coated film after curing. The ratio between the amount of the phenolic resin and the amount of the epoxy resin in the cured coated film is thus calculated.

The corrosion-resistant lacquer used in the invention is known per se, and is described in detail in the published specification of Japanese Laid-Open Patent Publication No. 55342/78.

The bonded can of this invention can be produced by coating TFS having the aforesaid features with the specially selected corrosion-resistant lacquer, baking the coated film layer, fabricating the resulting can-making blank in a conventional manner, and bonding the seam portion of the can body with a linear polyamide adhesive. Specifically, a rectangular blank having a specified dimension is cut out from the above coated TFS sheet. A side seaming portion is formed in the blank TFS sheet. A linear polyamide adhesive is applied to one or both of a pair of opposing marginal portions of the blank which are to form a side seam portion of the can body. The blank is then rolled up in a desired cylindrical form such as a cylinder or a prism, and the opposing marginal portions are lapped and bonded to make a can body. End closures are secured to the can body by double seaming or other known methods to form a can.

Examples of the linear polyamide adhesive that can be used in this invention include nylon 12, nylon 11, nylon 610, and the copolymers or mixtures thereof.

Manufacturing methods and adhesives for such a bonded can are described in detail in Japanese Patent Publications Nos. 18096/73, 37690/75 and 18978/76, Japanese Laid-Open Patent Publication No. 55342/78, and Journal of Japanese Society of Adhesion, Vol. 11, No. 2, pages 26–31 (1975).

The coated and bonded TFS can of this invention, when used as cans for retorting, have excellent lacquer film adhesion, hot water resistance and resistance to degradation with time because of the aforesaid characteristic features of the TFS and the various features of the specified corrsion-resistant lacquer. These cans can also be used for packing hot filled drinks, carbonate drinks and beer. They may also be used as general-purpose cans for packing aerosols, paints, confectionery, etc.

The following Examples specifically illustrate the present invention.

The various tests in these examples were performed by the following procedures.

(1) Bond strength of an empty can

From a bonded can having a bonded seam portion with a width of 5 mm, the seam portion was cut off longitudinally along the can axis. The sample thus obtained was subjected to a T-peel test by a tensile tester in a longitudinal direction starting with its end portion, and its strength at this time is measured. By this test, the adhesion of the lacquer after bonding is evaluated. The result is shown by an arithmetic average of the results obtained for several tens of sample cans.

(2) Bond strength degradation with time

An article is packed into sample cans, under usual filling conditions, and after seaming the filled cans are retorted at 125° C. for 20 minutes. The cans are stored for 6 months at 50° C., and then opened. The cans are washed with water, and dried. The sample prepared in the same way as in paragraph (1) above was subjected to T-peel by a tensile tester, and its strength at this time is measured. The results are shown by an arithmetic average obtained for several tens of sample cans.

(3) Number of cans broken in the retort process

One hundred sample cans are filled with an article under ordinary filling conditions, and after seaming, retorted at 135° C. for 120 minutes. The number of cans which are broken at this time is determined. (Breakage of the can means the delamination of the side seam portion of the bonded can.)

(4) Dissolved iron

Using filled cans stored for a year at 37° C., the amount of iron dissolved (mg) per 1000 gr of the contents is measured. The results are shown by an arithmetic average for 10 cans.

(5) Perforation

One hundred sample cans are filled with an article under ordinary filling conditions, and after seaming, retorted for at 125° C. for 20 minutes. They are then stored at 37° C. The number of perforations formed in the cans during one year from then is determined.

(6) Leakage with time

The degree of vacuum in the cans shown in (2) above is measured to check leakage of the contents.

(7) State of the inside surface of the can

The cans shown in (2) above are opened, and then, the state of rust formation on the inside surface of the can, the change of the coated film, etc. are evaluated visually.

EXAMPLE 1

A cold-rolled steel sheet having a thickness of 0.22 mm was electrolytically degreased in a solution of 70 g/liter of sodium hydroxide, washed with water, and pickled in a sulfuric acid solution in a concentration of 70 g/liter. After washing, the steel sheet was cathodically electrolyzed under the following conditions.

Treating bath: chromic anhydride: 100 g/liter; sulfuric acid: 0.2 g/liter; sodium fluorosilicate: 0.8 g/liter.
Bath temperature: 55° C.
Current density: 40 A/dm$^2$ The electrolyzed steel sheet was washed with warm water, and dried. The amount of metallic chromium, the amount of chromium oxide, the amount of alkali-soluble chromium after heating at 210° C. for 10 minutes, the ratio of the alkali-soluble chromium to the chromium oxide, the area of thickness unevenness of chromium oxide, and the amount of metal exposed in the resulting electrolyzed steel sheet were determined.

A lacquer of the following formulation was coated on both surfaces of the resulting steel sheet so that the thickness of the coating after drying would be 5 microns. One of the coated surfaces was baked at 150° C. for 10 minutes, and the opposite coated surface, at 215° C. for 10 minutes.

Epoxy resin: 75% by weight of Epon #1007 (a product of Shell Chemical Co.)

Phenolic resin: 25% by weight of a resol-type phenolic resin obtained by reacting 1 mole of a mixed phenol composed of 5% by weight of o-cresol and 95% by weight of bisphenol A with 1.5 moles of formaldehyde in the presence of 0.1 mole of ammonia for 180 minutes.

High-speed gel permeation showed this phenolic resin to contain 65% of molecules having three or more rings and 35% of molecules having two or less rings. It was found by the measurement of phenol resin oligomer volatilized during the baking that the baked coating of the lacquer consisted of 84% of components derived from the epoxy resin and 16% of components derived from the phenolic resin.

Bonded cans each having a capacity of 250 ml were produced from the resulting coated steel sheet using a nylon adhesive. Coffee drink was packed into the bonded cans, and after seaming the cans were retorted at 125° C. for 20 minutes and at 135° C. for 240 minutes.

The empty bonded cans and filled cans were examined for initial T-peel strength, T-peel strength after 6 months at 50° C., the state of breakage of the can body, the amount of dissolved iron, the state of perforation, the state of leakage and the corroded state of the inside surface.

The properties of the chromate-treated steel sheet, the lacquer used and the bonded can are shown in Table 1.

EXAMPLE 2

Example 1 was repeated except that the surface treating conditions were changed as shown below.

Treating bath: chromic anhydride: 80 g/liter; sulfuric acid: 0.1 g/liter; sodium fluoride: 0.6 g/liter.
Bath temperature: 58° C.
Current density: 30 A/dm$^2$

EXAMPLE 3

The same steel sheet as used in Example 1 was degreased and pickled as in Example 1, and subjected to chrome plating at 50° C. and a current density of 20 A/dm$^2$ using a bath containing 250 g/liter of chromic anhydride and 2.5 g/liter of sulfuric acid. The plated sheet was then cathodically electrolyzed under the following conditions, washed with warm water and dried. Otherwise, the same procedure as in Example 1 was repeated.

Treating bath: chromic anhydride: 40 g/liter; sulfuric acid: 0.1 g/liter
Bath temperature: 35° C.
Current density: 10 A/dm$^2$
The results are shown in Table 1.

EXAMPLE 4

Example 3 was repeated except that the surface treating conditions were changed as shown below.

Treating bath: chromic anhydride: 35 g/liter; ammonium fluoride: 1.2 g/liter.
Bath temperature: 50° C.
Current density: 25 A/dm$^2$
The results are shown in Table 1.

EXAMPLE 5

In the same way as in Example 3, a cold-rolled steel sheet was subjected to chrome plating at a temperature of 52° C. and a current density of 30 A/dm$^2$ using a bath containing 120 g/liter of chromic anhydride and 5 g/liter of sodium fluoride. The plated sheet was then cathodically electrolyzed under the following conditions, washed with warm water, and dried. Otherwise, the same procedure as in Example 3 was repeated. The results are shown in Table 1.
Treating bath: chromic anhydride: 60 g/liter; sulfuric acid: 0.1 g/liter; fluoroboric acid: 1.5 g/liter.
Bath temperature: 35° C.
Current density: 20 A/dm$^2$

Comparative Example 1

Example 1 was repeated except that the surface treating conditions were changed as shown below.
Treating bath: chromic anhydride: 80 g/liter; sulfuric acid: 0.5 g/liter; sodium fluorosilicate: 0.3 g/liter.
Bath temperature: 58° C.
Current density: 30 A/dm$^2$

Comparative Example 2

Example 5 was repeated except that the surface treating conditions were changed as shown below. The results are shown in Table 1.
Treating bath: chromic anhydride: 50 g/liter; sulfuric acid: 0.5 g/liter.
Bath temperature: 55° C.
Current density: 40 A/dm$^2$

Comparative Example 3

A cold-rolled steel sheet was subjected to chrome plating in the same way as in Example 3, and cathodically electrolyzed under the following conditions, followed by washing with warm water and drying. Otherwise, the same procedure as in Example 3 was repeated.
Treating bath: chromic anhydride: 60 g/liter; sulfuric acid: 0.4 g/liter.
Bath temperature: 40° C.
Current density: 10 A/dm$^2$
The results are shown in Table 1.

Comparative Example 4

A cold-rolled steel sheet was subjected to chrome plating in the same way as in Example 5, and then cathodically electrolyzed under the following conditions, followed by washing with water and drying. Otherwise, the same procedure as in Example 5 was repeated.
Treating bath: chromic anhydride: 100 g/liter; sulfuric acid: 0.5 g/liter; sodium fluorosilicate: 1.0 g/liter.
Bath temperature: 50° C.
Current density: 40 A/dm$^2$
The results are shown in Table 1.

Comparative Example 5

A cold-rolled steel sheet was electrolyzed under the conditions set forth in Comparative Example 2, and then left to stand in the treating bath for 5 seconds, followed by washing with water and drying. The results are shown in Table 1.

Comparative Example 6

A cold-rolled steel sheet was degreased and pickled in the same way as in Example 1, and then subjected to chrome plating at a temperature of 55° C. and a current density of 20 A/dm$^2$ using a treating bath containing 180 g/liter of chromic anhydride, 1.5 g/liter of sulfuric acid and 0.9 g/liter of sodium fluorosilicate. The plated steel sheet was then cathodically electrolyzed under the following conditions, followed by washing with water and drying.
Treating bath: chromic anhydride: 60 g/liter; sulfuric acid: 0.5 g/liter; sodium fluorosilicate: 0.3 g/liter.
Bath temperature: 55° C.
Current density: 10 A/dm$^2$
The results are shown in Table 1.

Comparative Example 7

A cold-rolled steel sheet was electrolyzed under the conditions shown in Example 4, and then allowed to stand in the treating bath for 10 seconds, followed by washing with water and drying.
The results are shown in Table 1.

Comparative Example 8

Example 1 was repeated except that the surface treating conditions were changed as shown below. The results are shown in Table 1.
Treating bath: chromic anhydride: 80 g/liter; sulfuric acid; 0.4 g/liter; fluoroboric acid: 0.6 g/liter.
Bath temperature: 55° C.
Current density: 40 A/dm$^2$

EXAMPLE 6

Example 1 was repeated except that p-cresol was used instead of o-cresol. The results are shown in Table 1.

EXAMPLE 7

Example 1 was repeated except that phenol was used instead of o-cresol, and the reaction time was changed to 100 minutes. The results are shown in Table 1.

EXAMPLE 8

Example 1 was repeated except that Epon #1009 was used instead of Epon #1007. The results are shown in Table 1.

Comparative Example 9

Example 1 was repeated except that Epon #1004 was used instead of Epon #1007. The results are shown in Table 1.

Comparative Example 10

Example 1 was repeated except that the proportion of the epoxy resin in the lacquer composition was changed to 65% by weight, and the proportion of the phenolic resin, to 35% by weight. The results are shown in Table 1.

Comparative Example 11

Example 1 was repeated except that in the lacquer composition, the proportion of the epoxy resin was changed to 90% by weight, and the proportion of the phenolic resin, to 10% by weight. The results are shown in Table 1.

Comparative Example 12

Example 1 was repeated except that in the phenol component, the proportion of o-cresol was changed to 30% by weight, and the proportion of bisphenol A to 70% by weight. The results are shown in Table 1.

Comparative Example 13

Example 1 was repeated except that in the phenol component, the proportion of o-cresol was changed to 3% by weight, and the proportion of bisphenol A, to 97% by weight. The results are shown in Table 1.

Comparative Example 14

Example 1 was repeated except that the time for the phenolic resin-synthesizing reaction was changed to 240 minutes. The results are shown in Table 1.

Comparative Example 15

Example 1 was repeated except that the time for the phenolic resin-synthesizing reaction was changed to 120 minutes. The results are shown in Table 1.

Comparative Example 16

Example 1 was repeated except that the final baking temperature for the coated lacquer film was changed to 200° C. The results are shown in Table 1.

Comparative Example 17

Example 1 was repeated except that the final baking temperature for the coated lacquer film was changed to 230° C. The results are shown in Table 1.

TABLE 1

| Example (Ex.) or Comparative Example (CEx.) | Amount of metallic chromium mg/m$^2$ | Amount of chromium oxide (A) mg/m$^2$ | Amount of alkali-soluble chromium (B) mg/m$^2$ | (B)/(A) % | Thickness unevenness of the oxide % | Amount of metal exposed mg/dm$^2$ | Epon # | Epoxy/phenol Weight ratio | Phenol/bisphenol A in the resol Weight ratio | High-molecular-weight portion to low-molecular-weight portion in the resol Weight ratio |
|---|---|---|---|---|---|---|---|---|---|---|
| Ex. 1 | 118 | 16 | 11 | 69 | 2 | 18 | #1007 | 75/25 | 5/95 | 65/35 |
| Ex. 2 | 111 | 16 | 10 | 63 | 2 | 17 | " | " | " | " |
| Ex. 3 | 118 | 17 | 7 | 41 | 8 | 18 | " | " | " | " |
| Ex. 4 | 112 | 27 | 7 | 26 | 0 | 12 | " | " | " | " |
| Ex. 5 | 105 | 13 | 5 | 38 | 0 | 9 | " | " | " | " |
| CEx. 1 | 109 | 13 | 7 | 54 | 11 | 15 | " | " | " | " |
| CEx. 2 | 98 | 15 | 8 | 53 | 2 | 32 | " | " | " | " |
| CEx. 3 | 93 | 18 | 15 | 83 | 0 | 16 | " | " | " | " |
| CEx. 4 | 135 | 25 | 12 | 48 | 12 | 19 | " | " | " | " |
| CEx. 5 | 60 | 4 | 2 | 50 | 0 | 23 | " | " | " | " |
| CEx. 6 | 92 | 10 | 8 | 80 | 3 | 29 | " | " | " | " |
| CEx. 7 | 98 | 3 | 2 | 67 | 0 | 12 | " | " | " | " |
| CEx. 8 | 101 | 32 | 10 | 31 | 0 | 17 | " | " | " | " |
| Ex. 6 | 105 | 13 | 5 | 38 | " | 9 | " | " | " | 62/38 |
| Ex. 7 | " | " | " | " | " | " | " | " | " | 60/40 |
| Ex. 8 | " | " | " | " | " | " | #1009 | " | " | 70/30 |
| CEx. 9 | " | " | " | " | " | " | #1004 | " | " | 72/28 |
| CEx. 10 | " | " | " | " | " | " | #1007 | 65/35 | " | 65/35 |
| CEx. 11 | " | " | " | " | " | " | " | 90/10 | 3/97 | 60/40 |
| CEx. 12 | " | " | " | " | " | " | " | 75/25 | 30/70 | 55/45 |
| CEx. 13 | " | " | " | " | " | " | " | " | 3/97 | 60/40 |
| CEx. 14 | " | " | " | " | " | " | " | " | 5/95 | 75/25 |
| CEx. 15 | " | " | " | " | " | " | " | " | " | 55/45 |
| CEx. 16 | " | " | " | " | " | " | " | " | " | 65/35 |
| CEx. 17 | " | " | " | " | " | " | " | " | " | " |

| Example (Ex.) or Comparative Example (CEx.) | Baking temperature for the lacquer °C. | Epoxy to phenol in the lacquer film Weight ratio | T-peel strength Kg/5mm | T-peel strength after storage at 50° C. for 6 months Kg/5mm | Can body breakage by treatment at 135° C. for 120 minutes Number | Amount of iron dissolved ppm | Perforated cans Number | Cans which showed leakage Number | State of the inside surface |
|---|---|---|---|---|---|---|---|---|---|
| Ex. 1 | 215 | 84/16 | 7.5 | 5.0 | 3 | 0.9 | None | None | Good |
| Ex. 2 | " | " | 7.5 | 4.5 | 8 | 0.6 | " | " | " |
| Ex. 3 | " | " | 8.0 | 6.0 | 0 | 1.0 | " | " | " |
| Ex. 4 | " | " | 8.0 | 6.0 | 0 | 1.3 | " | " | " |
| Ex. 5 | " | " | 8.5 | 7.5 | 0 | 0.7 | " | " | " |
| CEx. 1 | " | " | 6.5 | 3.5 | 82 | 0.8 | " | " | " |
| CEx. 2 | " | " | 7.5 | 2.5 | 62 | 1.2 | " | " | " |
| CEx. 3 | " | " | 8.0 | 3.5 | 68 | 0.8 | " | " | " |
| CEx. 4 | " | " | 7.5 | 3.5 | 88 | 1.8 | 3 | " | Fabricated portion corroded |
| CEx. 5 | " | " | 7.0 | 2.0 | 95 | 1.5 | None | " | Fabricated portion corroded |
| CEx. 6 | " | " | 7.5 | 1.0 | 73 | 0.9 | 3 | " | Good |
| CEx. 7 | " | " | 5.0 | 0.5 | 93 | 1.2 | " | " | " |
| CEx. 8 | " | " | 7.0 | 4.0 | 68 | 1.6 | 15 | " | Fabricated portion corroded |
| Ex. 6 | " | 85/15 | 7.0 | 6.0 | 0 | 0.7 | None | " | Good |
| Ex. 7 | " | 83/17 | 6.5 | 5.0 | 0 | 1.0 | " | " | " |
| Ex. 8 | " | 81/19 | 6.5 | 6.0 | 0 | 0.8 | " | " | " |
| CEx. 9 | " | 82/18 | 4.0 | — | — | 1.4 | " | " | Fabricated portion corroded |
| CEx. 10 | " | 84/16 | 6.0 | 5.0 | 0 | 1.8 | 2 | 12 | Fabricated portion corroded |
| CEx. 11 | " | 91/9 | 3.5 | — | — | — | — | — | — |
| CEx. 12 | " | 85/15 | 7.0 | 4.5 | 2 | 1.2 | None | None | Good |
| CEx. 13 | " | 86/14 | 4.5 | — | — | — | — | — | — |

TABLE 1-continued

| CEx. 14 | " | 80/20 | 5.5 | 4.5 | 6 | 1.0 | None | None | Good |
| --- | --- | --- | --- | --- | --- | --- | --- | --- | --- |
| CEx. 15 | " | 88/12 | 2.0 | — | — | — | — | — | — |
| CEx. 16 | 200 | 82/18 | 6.5 | 3.5 | 41 | 0.8 | None | None | Good |
| CEx. 17 | 300 | 88/12 | 5.5 | 4.5 | 4 | 1.2 | " | 3 | " |

What we claim is:

1. A retortable bonded can made of an electrolytic chromic acid treated steel sheet wherein at least a part of the can body is composed of a steel sheet having on at least one surface thereof a metallic chromium layer, a chromium oxide layer and an organic lacquer film layer arranged in this order from the steel sheet surface and at least a part of the seaming portion of the can body is bonded with an organic adhesive, characterized in that (1) the amounts of the metallic chromium layer and the chromium oxide layer deposited are 70–130 mg/m$^2$ and 5–30 mg/m$^2$, respectively, as metallic chromium; the amount of alkali-soluble chromium in these layers after heating at 210° C. for 10 minutes is not more than 12 mg/m$^2$ and not more than 70% by weight of the amount of the deposited chromium oxide before heating; the area of thickness unevenness of the chromium oxide is not more than 10%; and the amount of metal exposed, expressed as the amount of copper deposited, is not more than 30 mg/dm$^2$, (2) the organic lacquer film layer is a baked and cured film of a mixed lacquer composed of 70 to 85 parts by weight of an epoxy resin having a number average molecular weight of 2900 to 3750 and derived from epichlorohydrin and bisphenol A and 30 to 15 parts by weight of a resol-type phenolic resin, the total amount of these resins being 100 parts by weight; the phenolic resin is obtained by reacting a mixed phenol composed of 5 to 20% by weight of a monohydric phenol and 95 to 80% by weight of bisphenol A with an aldehyde in the presence of ammonia and has such a molecular weight distribution that the proportion of a high-molecular-weight portion having 3 or more rings is 60 to 70% by weight and the proportion of a low-molecular-weight portion having 2 or less rings is 40 to 30% by weight; and the baked and cured film contains 83 to 87 parts by weight of the epoxy resin and 17 to 13 parts by weight of the phenolic resin based on 100 parts by weight of the epoxy resin and the phenolic resin combined, and (3) the adhesive is a linear polyamide adhesive.

* * * * *